US012488748B2

(12) United States Patent
Kim et al.

(10) Patent No.: US 12,488,748 B2
(45) Date of Patent: Dec. 2, 2025

(54) PIXEL OF A DISPLAY DEVICE AND DISPLAY DEVICE

(71) Applicant: Samsung Display Co., LTD., Yongin-si (KR)

(72) Inventors: Kyungho Kim, Yongin-si (KR); Gichang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/450,189

(22) Filed: Aug. 15, 2023

(65) Prior Publication Data

US 2024/0119899 A1 Apr. 11, 2024

(30) Foreign Application Priority Data

Oct. 6, 2022 (KR) ........................ 10-2022-0128184

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01)

(58) Field of Classification Search
CPC ......... G09G 3/3233; G09G 2300/0819; G09G 2300/0842; G09G 2310/08; G09G 2300/0852; G09G 2300/0861; G09G 2310/0251; G09G 2310/0262; G09G 3/3275; G09G 3/3266; G09G 2300/0809; G09G 2330/021
See application file for complete search history.

(56) References Cited

U.S. PATENT DOCUMENTS

| | | | | |
|---|---|---|---|---|
| 9,349,321 | B2 * | 5/2016 | Chen | G09G 3/3266 |
| 11,710,452 | B2 * | 7/2023 | Chen | G09G 3/3233 345/691 |
| 11,908,414 | B2 * | 2/2024 | Qing | G09G 3/3241 |
| 12,165,581 | B2 * | 12/2024 | Liu | G09G 3/3233 |
| 2012/0038683 | A1 * | 2/2012 | Park | G09G 3/3233 345/77 |
| 2020/0074922 | A1 * | 3/2020 | Cheng | G09G 3/3225 |
| 2022/0157238 | A1 * | 5/2022 | Wang | G09G 3/3233 |
| 2024/0221646 | A1 * | 7/2024 | Chen | G09G 3/3233 |

FOREIGN PATENT DOCUMENTS

| | | | | |
|---|---|---|---|---|
| CN | 111724745 A | * | 9/2020 | G09G 3/32 |
| CN | 113838420 A | * | 12/2021 | G09G 3/3225 |
| KR | 10-0570995 B1 | | 4/2006 | |

* cited by examiner

*Primary Examiner* — Jeff Piziali
(74) *Attorney, Agent, or Firm* — Womble Bond Dickinson (US) LLP

(57) ABSTRACT

A pixel includes a first transistor coupled to a first node, a second transistor receiving a writing signal, a third transistor receiving a compensation signal, a first terminal coupled to the third node, and a second terminal coupled to a fourth node, a fourth transistor receiving an initialization signal, a first terminal coupled to the fourth node, and a second terminal coupled to an initialization voltage line, a fifth transistor receiving a first emission signal, a first terminal coupled to the first power supply voltage line, and a second terminal coupled to the second node, a light emitting element coupled to the third node and a second power supply voltage line, and an eighth transistor receiving a second emission signal, a first terminal coupled to the first node, and a second terminal coupled to the fourth node.

18 Claims, 12 Drawing Sheets

PIXEL OF A DISPLAY DEVICE AND DISPLAY DEVICE

CROSS-REFERENCE TO RELATED APPLICATION(S)

The present application claims priority to and the benefit of Korean Patent Application No. 10-2022-0128184, filed on Oct. 6, 2022 in the Korean Intellectual Property Office (KIPO), the entire content of which is incorporated herein by reference.

BACKGROUND

1. Field

Aspects of some embodiments of the present inventive concept relate to a display device.

2. Description of the Related Art

Driving transistors of pixels of a display device, such as an organic light emitting diode (OLED) display device, may have different threshold voltages due to process or manufacturing variations, degradation, etc. Because of this threshold voltage variation, the pixels of the display device may not emit light with uniform luminance, or may not emit light as intended consistent with display data.

To prevent or reduce the luminance non-uniformity, a pixel performing a compensation operation that compensates for a threshold voltage of a driving transistor may be utilized. However, this pixel may require one or more additional signals for performing the compensation operation, and a phenomenon (e.g., a kickback phenomenon) where a data voltage stored in the pixel is changed at an edge of the signal may occur. Further, if the data voltage is undesirably changed, a swing range of the data voltage may be increased, and power consumption of the display device may be relatively increased.

The above information disclosed in this Background section is only for enhancement of understanding of the background and therefore the information discussed in this Background section does not necessarily constitute prior art.

SUMMARY

Aspects of some embodiments of the present inventive concept relate to a display device, and for example, to a pixel and a display device including the pixel.

Aspects of some embodiments include a pixel of a display device capable of reducing power consumption.

Aspects of some embodiments include a display device capable of reducing power consumption.

According to some embodiments, a pixel of a display device includes a first capacitor coupled between a first power supply voltage line and a first node, a first transistor including a gate coupled to the first node, a first terminal coupled to a second node, and a second terminal coupled to a third node, a second transistor including a gate receiving a writing signal, a first terminal coupled to a data line, and a second terminal coupled to the second node, a third transistor including a gate receiving a compensation signal, a first terminal coupled to the third node, and a second terminal coupled to a fourth node, a fourth transistor including a gate receiving an initialization signal, a first terminal coupled to the fourth node, and a second terminal coupled to an initialization voltage line, a fifth transistor including a gate receiving a first emission signal, a first terminal coupled to the first power supply voltage line, and a second terminal coupled to the second node, a light emitting element including an anode coupled to the third node, and a cathode coupled to a second power supply voltage line, and an eighth transistor including a gate receiving a second emission signal having a phase different from a phase of the first emission signal, a first terminal coupled to the first node, and a second terminal coupled to the fourth node.

According to some embodiments, after a data voltage of the data line is applied to the first node through the second transistor, the first transistor, the third transistor and the eighth transistor, and before or when the light emitting element emits light, the second emission signal may have a rising edge, and a voltage of the first node may increase at the rising edge of the second emission signal.

According to some embodiments, the second emission signal may be an inverted signal of the first emission signal.

According to some embodiments, the pixel may further include a sixth transistor including a gate receiving the first emission signal, a first terminal coupled to the third node, and a second terminal coupled to the anode of the light emitting element.

According to some embodiments, the pixel may further include a seventh transistor including a gate receiving a bypass signal, a first terminal coupled to an anode initialization voltage line, and a second terminal coupled to the anode of the light emitting element.

According to some embodiments, the bypass signal may be a previous writing signal for a previous pixel row.

According to some embodiments, the first, second, fifth and eighth transistors may be implemented with p-type metal-oxide-semiconductor (PMOS) transistors, and the third and fourth transistors may be implemented with n-type metal-oxide-semiconductor (NMOS) transistors.

According to some embodiments, a frame period for the pixel may include a non-emission period in which the light emitting element does not emit light, and an emission period in which the light emitting element emits light, and the non-emission period may include an initialization period in which the first node is initialized, and a data writing and compensation period in which a data voltage of the data line is applied to the first node.

According to some embodiments, in the initialization period, the initialization signal and the second emission signal may have an active level, the writing signal, the compensation signal and the first emission signal may have an inactive level, the fourth transistor may be turned on in response to the initialization signal having the active level, the eighth transistor may be turned on in response to the second emission signal having the active level, and an initialization voltage of the initialization voltage line may be applied to the first node through the fourth transistor and the eighth transistor.

According to some embodiments, in the data writing and compensation period, the writing signal, the compensation signal and the second emission signal may have an active level, and the initialization signal and the first emission signal may have an inactive level, the second transistor may be turned on in response to the writing signal having the active level, the third transistor may be turned on in response to the compensation signal having the active level, the eighth transistor may be turned on in response to the second emission signal having the active level, and a data voltage of the data line may be applied to the first node through the second transistor, the first transistor, the third transistor and the eighth transistor.

According to some embodiments, the non-emission period may further include a bias period in which a bias voltage is applied to the second node after the data writing and compensation period.

According to some embodiments, in the bias period, the writing signal and the second emission signal may have an active level, the compensation signal, the initialization signal and the first emission signal may have an inactive level, the second transistor may be turned on in response to the writing signal having the active level, and the bias voltage of the data line may be applied to the second node through the second transistor.

According to some embodiments, in the emission period, the first emission signal may have an active level, the writing signal, the compensation signal, the initialization signal and the second emission signal may have an inactive level, the fifth transistor may be turned on in response to the first emission signal having the active level, the first transistor may generate a driving current based on a voltage of the first node, and the light emitting element may emit light based on the driving current.

According to some embodiments, the second emission signal may be activated when the first emission signal is deactivated, and may be deactivated when the first emission signal is activated.

According to some embodiments, the second emission signal may be activated after the first emission signal is deactivated and before at least one of the writing, initialization and compensation signals is activated, and may be deactivated before the first emission signal is activated and after all of the writing, initialization and compensation signals are deactivated.

According to some embodiments, the pixel may further include a second capacitor coupled between the first power supply voltage line and the second node.

According to some embodiments, the second capacitor may hold a data voltage applied to the second node through the data line and the second transistor.

According to some embodiments, a pixel of a display device includes a first capacitor coupled between a first power supply voltage line and a first node, a second capacitor coupled between the first power supply voltage line and a second node, a first transistor including a gate coupled to the first node, a first terminal coupled to the second node, and a second terminal coupled to a third node, a second transistor including a gate receiving a writing signal, a first terminal coupled to a data line, and a second terminal coupled to the second node, a third transistor including a gate receiving a compensation signal, a first terminal coupled to the third node, and a second terminal coupled to a fourth node, a fourth transistor including a gate receiving an initialization signal, a first terminal coupled to the fourth node, and a second terminal coupled to an initialization voltage line, a fifth transistor including a gate receiving an emission signal, a first terminal coupled to the first power supply voltage line, and a second terminal coupled to the second node, a sixth transistor including a gate receiving the emission signal, a first terminal coupled to the third node, and a second terminal coupled to a fifth node, a seventh transistor including a gate receiving a bypass signal, a first terminal "oupl'd to an anode initialization voltage line, and a second terminal coupled to the fifth node, a light emitting element including an anode coupled to the fifth node, and a cathode coupled to a second power supply voltage line, and an eighth transistor including a gate receiving an inverted signal of the emission signal, a first terminal coupled to the first node, and a second terminal coupled to the fourth node.

According to some embodiments, a display device includes a display panel including a plurality of pixels, a data driver configured to provide a data voltage to each of the plurality of pixels, a scan driver configured to provide a writing signal, a compensation signal and an initialization signal to each of the plurality of pixels, and an emission driver configured to provide first and second emission signals having different phases to each of the plurality of pixels. Each of the plurality of pixels includes a first capacitor coupled between a first power supply voltage line and a first node, a first transistor including a gate coupled to the first node, a first terminal coupled to a second node, and a second terminal coupled to a third node, a second transistor including a gate receiving the writing signal, a first terminal coupled to a data line, and a second terminal coupled to the second node, a third transistor including a gate receiving the compensation signal, a first terminal coupled to the third node, and a second terminal coupled to a fourth node, a fourth transistor including a gate receiving the initialization signal, a first terminal coupled to the fourth node, and a second terminal coupled to an initialization voltage line, a fifth transistor including a gate receiving the first emission signal, a first terminal coupled to the first power supply voltage line, and a second terminal coupled to the second node, a light emitting element including an anode coupled to the third node, and a cathode coupled to a second power supply voltage line, and an eighth transistor including a gate receiving the second emission signal, a first terminal coupled to the first node, and a second terminal coupled to the fourth node.

According to some embodiments, after a data voltage of the data line is applied to the first node through the second transistor, the first transistor, the third transistor and the eighth transistor, and before or when the light emitting element emits light, the second emission signal may have a rising edge, and a voltage of the first node may increase at the rising edge of the second emission signal.

As described above, a pixel of a display device according to some embodiments may include an eighth transistor that couples a first node (e.g., a gate node coupled to a gate of a first transistor) and a fourth node in response to a second emission signal (e.g., an inverted signal of a first emission signal) having a phase different from a phase of the first emission signal. According to some embodiments, a voltage of the first node may be increased at a rising edge of the second emission signal. Accordingly, a swing range of a data voltage may be reduced, and power consumption of the display device may be relatively reduced.

Further, the pixel of the display device according to some embodiments may further include a second capacitor coupled between a first power supply voltage line (e.g., a high power supply voltage line) and a second node (e.g., a source node coupled to a source of the first transistor). By the second capacitor for holding the data voltage applied to the second node, a data writing and compensation period may be increased, and a data writing and compensation operation may be normally performed even if the display devices operates at a high frequency (e.g., about 240 Hz).

BRIEF DESCRIPTION OF THE DRAWINGS

Aspects of some illustrative, non-limiting embodiments will be more clearly understood from the following detailed description in conjunction with the accompanying drawings.

DETAILED DESCRIPTION

Hereinafter, aspects of some embodiments of the present inventive concept will be explained in more detail with reference to the accompanying drawings.

Figure 1:
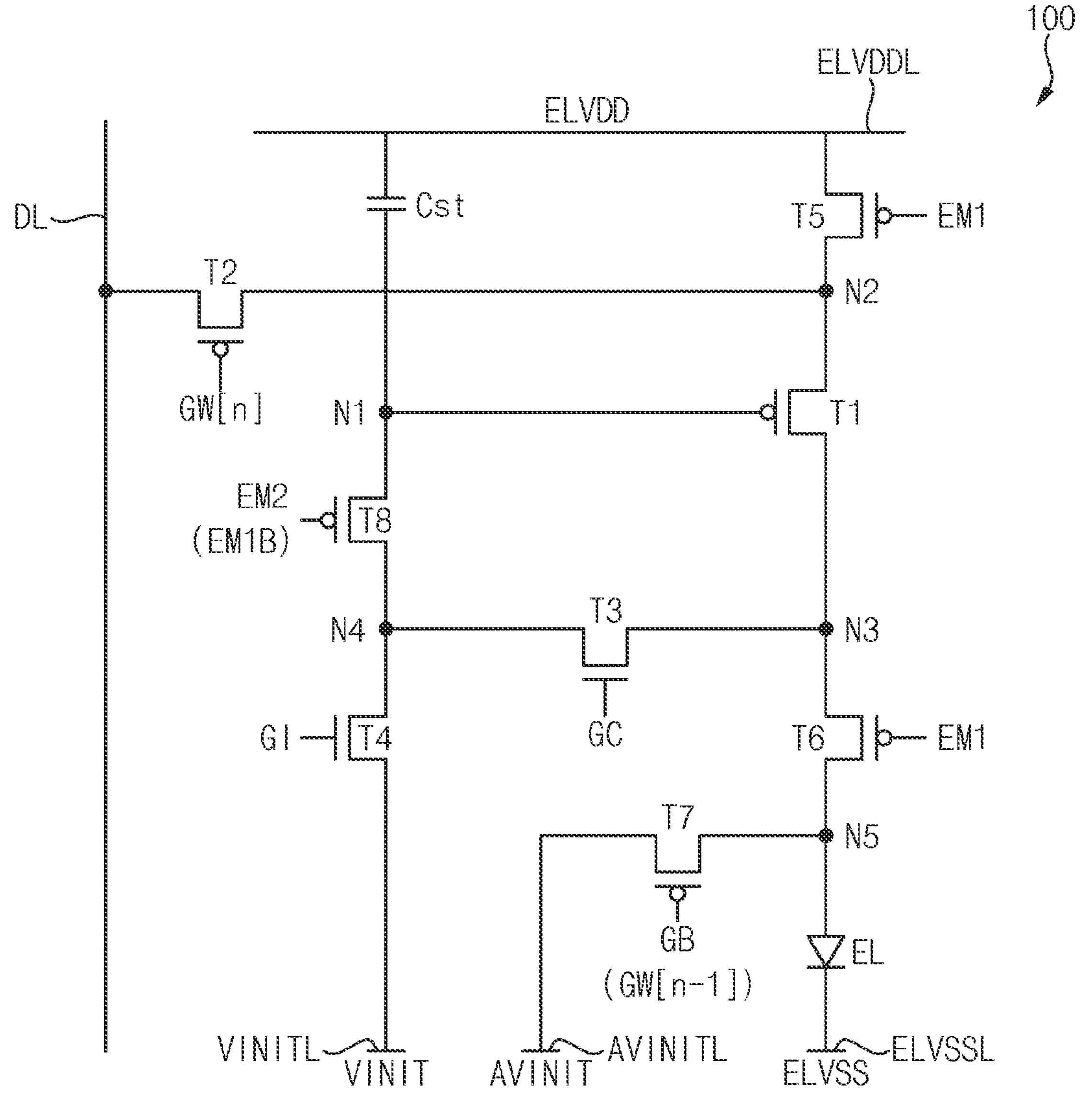
FIG. 1 is a circuit diagram illustrating a pixel of a display device according to some embodiments.

FIG. 1 is a circuit diagram illustrating a pixel of a display device according to some embodiments.

Referring to FIG. 1, a pixel 100 according to some embodiments may include a first capacitor Cst, a first transistor T1, a second transistor T2, a third transistor T3, a fourth transistor T4, a fifth transistor T5, a light emitting element EL and an eighth transistor T8. In some embodiments, the pixel 100 may further include a sixth transistor T6 and a seventh transistor T7. Embodiments according to the present disclosure are not limited thereto, however. For example, some embodiments may include additional components or fewer components without departing from the spirit and scope of embodiments according to the present disclosure.

The first capacitor Cst may be coupled between a first power supply voltage line ELVDDL and a first node N1. In some embodiments, the first power supply voltage line ELVDDL may be a high-power supply voltage line ELVDDL for transferring a high power supply voltage ELVDD. Further, the first node N1 may be a gate node coupled to a gate of the first transistor T1. In some embodiments, the first capacitor Cst may be referred to as a storage capacitor for storing a data voltage. Further, in some embodiments, the first capacitor Cst may include a first electrode coupled to the first power supply voltage line ELVDDL, and a second electrode coupled to the first node N1.

The first transistor T1 may generate a driving current based on a voltage at the first node N1. In some embodiments, the first transistor T1 may be referred to as a driving transistor for driving the light emitting element EL. Further, in some embodiments, the first transistor T1 may include a gate (e.g., a gate electrode) coupled to the first node N1, a first terminal (e.g., a source) coupled to a second node N2, and a second terminal (e.g., a drain) coupled to a third node N3.

The second transistor T2 may be configured to couple or electrically connect a data line DL to the second node N2 in response to a writing signal GW[n]. The second node N2 may be a source node coupled to a source of the first transistor T1. In some embodiments, the second transistor T2 may be referred to as a scan transistor or a switching transistor for transferring the data voltage of the data line DL to the second node N2. Further, in some embodiments, the second transistor T2 may include a gate configured to receive the writing signal GW[n], a first terminal coupled to the data line DL, and a second terminal coupled to the second node N2.

The third transistor T3 may be configured to couple or electrically connect the third node N3 and a fourth node N4 to each other in response to a compensation signal GC. The third node N3 may be a drain node coupled to a drain of the first transistor T1. In some embodiments, the third transistor T3 may be referred to as a compensating transistor for diode-connecting the first transistor T1. Further, in some embodiments, the third transistor T3 may include a gate receiving the compensation signal GC, a first terminal coupled to the third node N3, and a second terminal coupled to the fourth node N4.

The fourth transistor T4 may be configured to couple or electrically connect an initialization voltage line VINITL to the fourth node N4 in response to an initialization signal GI. In some embodiments, the fourth transistor T4 may be referred to as a gate initializing transistor for providing an initialization voltage VINIT to the first node N1, or the gate node. Further, in some embodiments, the fourth transistor T4 may include a gate configured to receive the initialization signal GI, a first terminal coupled to the fourth node N4, and a second terminal coupled to the initialization voltage line VINITL.

The fifth transistor T5 may be configured to couple or electrically connect the first power supply voltage line ELVDDL and the second node N2 to each other in response to a first emission signal EM1, and the sixth transistor T6 may be configured to couple or electrically connect the third node N3 and a fifth node N5 to each other in response to the first emission signal EM1. In some embodiments, the fifth transistor T5 and the sixth transistor T6 may be referred to as emission transistors for forming a path of the driving current from the first power supply voltage line ELVDDL to a second power supply voltage line ELVSSL. Further, in some embodiments, the fifth transistor T5 may include a gate configured to receive the first emission signal EM1, a first terminal coupled to the first power supply voltage line ELVDDL, and a second terminal coupled to the second node N2, and the sixth transistor T6 may include a gate configured to receive the first emission signal EM1, a first terminal coupled to the third node N3, and a second terminal coupled to the fifth node N5, or an anode of the light emitting element EL.

The seventh transistor T7 may be configured to couple or electrically connect an anode initialization voltage line AVINITL to the fifth node N5 in response to a bypass signal GB. In some embodiments, the seventh transistor T7 may be referred to as an anode initializing transistor for providing an anode initialization voltage AVINIT to the fifth node N5, or the anode of the light emitting element EL. In some embodiments, the initialization voltage line VINITL and the anode initialization voltage line AVINITL may be different lines. In other embodiments, the initialization voltage line VINITL and the anode initialization voltage line AVINITL may be the same line. In this case, the initialization voltage VINIT and the anode initialization voltage AVINIT may be the same voltage. Further, in some embodiments, the bypass signal GB may be a previous writing signal GW[n−1] for a previous pixel row. For example, in a case where the pixel 100 is located in an N-th pixel row, where N is an integer greater than 1, the bypass signal GB for the pixel 100 may be the writing signal GW[n−1] for pixels in an (N−1)-th pixel row. In other embodiments, the bypass signal GB may be different from the writing signal GW[n−1]. Further, in some embodiments, the seventh transistor T7 may include a gate configured to receive the bypass signal GB, a first terminal coupled to the anode initialization voltage line AVINITL, and a second terminal coupled to the fifth node N5, or the anode of the light emitting element EL.

The light emitting element EL may emit light based on the driving current generated by the first transistor T1. In some embodiments, the light emitting element EL may be, but not limited to, an organic light emitting diode (OLED). In other embodiments, the light emitting element EL may be a nano light emitting diode (NED), a quantum dot (QD) light emitting diode, an inorganic light emitting diode, or any other suitable light emitting element. Further, in some embodiments, the light emitting element EL may include an anode coupled to the fifth node N5, or coupled to the third node T3 through the sixth transistor T6, and a cathode coupled to the second power supply voltage line ELVSSL. In some embodiments, the second power supply voltage line ELVSSL may be a low power supply voltage line ELVSSL configured to transfer a low power supply voltage ELVSS.

The eighth transistor T8 may be configured to couple or electrically connect the first node N1 and the fourth node N4 to each other in response to a second emission signal EM2. The second emission signal EM2 may have a phase different from a phase of the first emission signal EM1. In some embodiments, the second emission signal EM2 may be an inverted signal of the first emission signal EM1. For example, the second emission signal EM2 may be activated based on the first emission signal EM1 being deactivated, and may be deactivated based on the first emission signal EM1 being activated. Thus, the second emission signal EM2 may have an active level in a non-emission period in which the first emission signal EM1 has an inactive level, and may have the inactive level in an emission period in which the first emission signal EM1 has the active level. Accordingly, the eighth transistor T8 may be turned on in the non-emission period, and may be turned off in the emission period. Further, in some embodiments, the eighth transistor T8 may include a gate configured to receive the second emission signal EM2, a first terminal coupled to the first node N1, and a second terminal coupled to the fourth node N4.

In some embodiments, at least a portion of the first through eighth transistors T1 through T8 of the pixel 100 may be implemented with n-type (or n-channel) metal-oxide-semiconductor (NMOS) transistors. For example, as illustrated in FIG. 1, the first, second, fifth and eighth transistors T1, T2 T5 and T8 may be implemented with p-type (or p-channel) metal-oxide-semiconductor (PMOS) transistors, and the third and fourth transistors T3 and T4 may be implemented with the NMOS transistors. In other embodiments, all of the first through eighth transistors T1 through T8 may be implemented with the PMOS transistors, or may be implemented with the NMOS transistors.

Hereinafter, an example of an operation of the pixel 100 according to some embodiments will be described in more detail below with reference to FIGS. 1 through 6.

Figure 2:
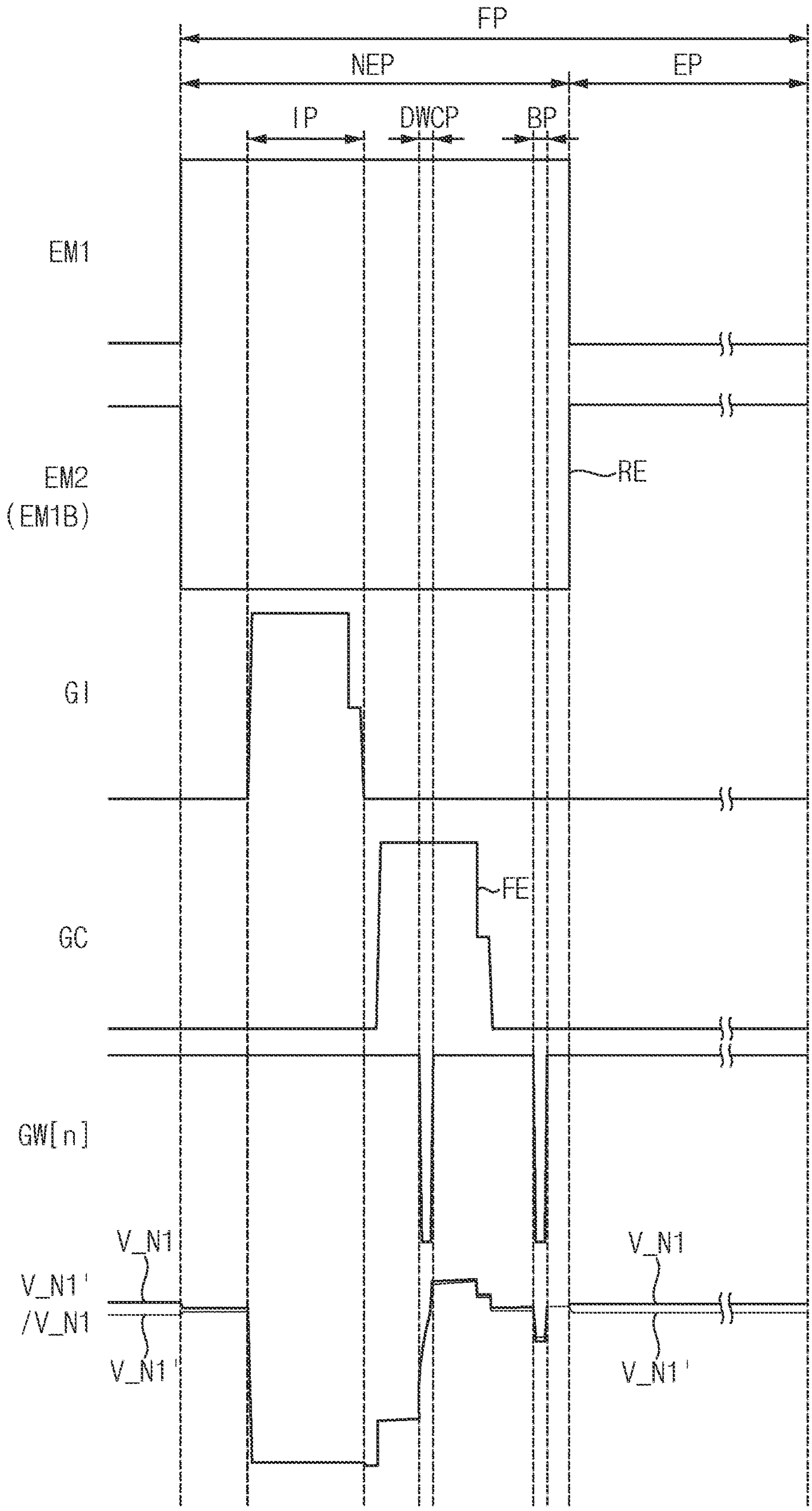
FIG. 2 is a timing diagram for describing an example of an operation of a pixel according to some embodiments.
Figure 3:
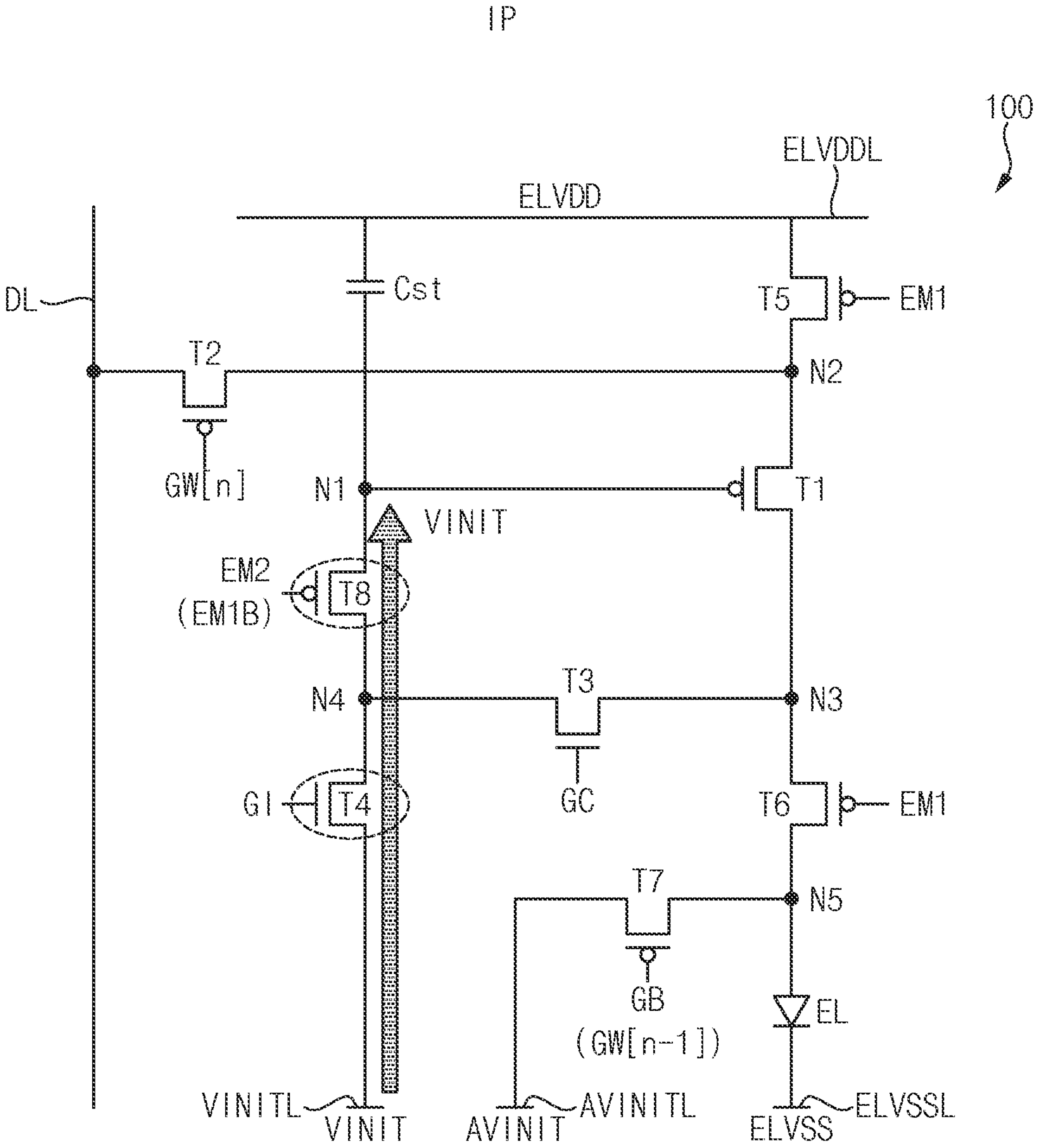
FIG. 3 is a circuit diagram for describing an operation of a pixel in an initialization period.
Figure 4:
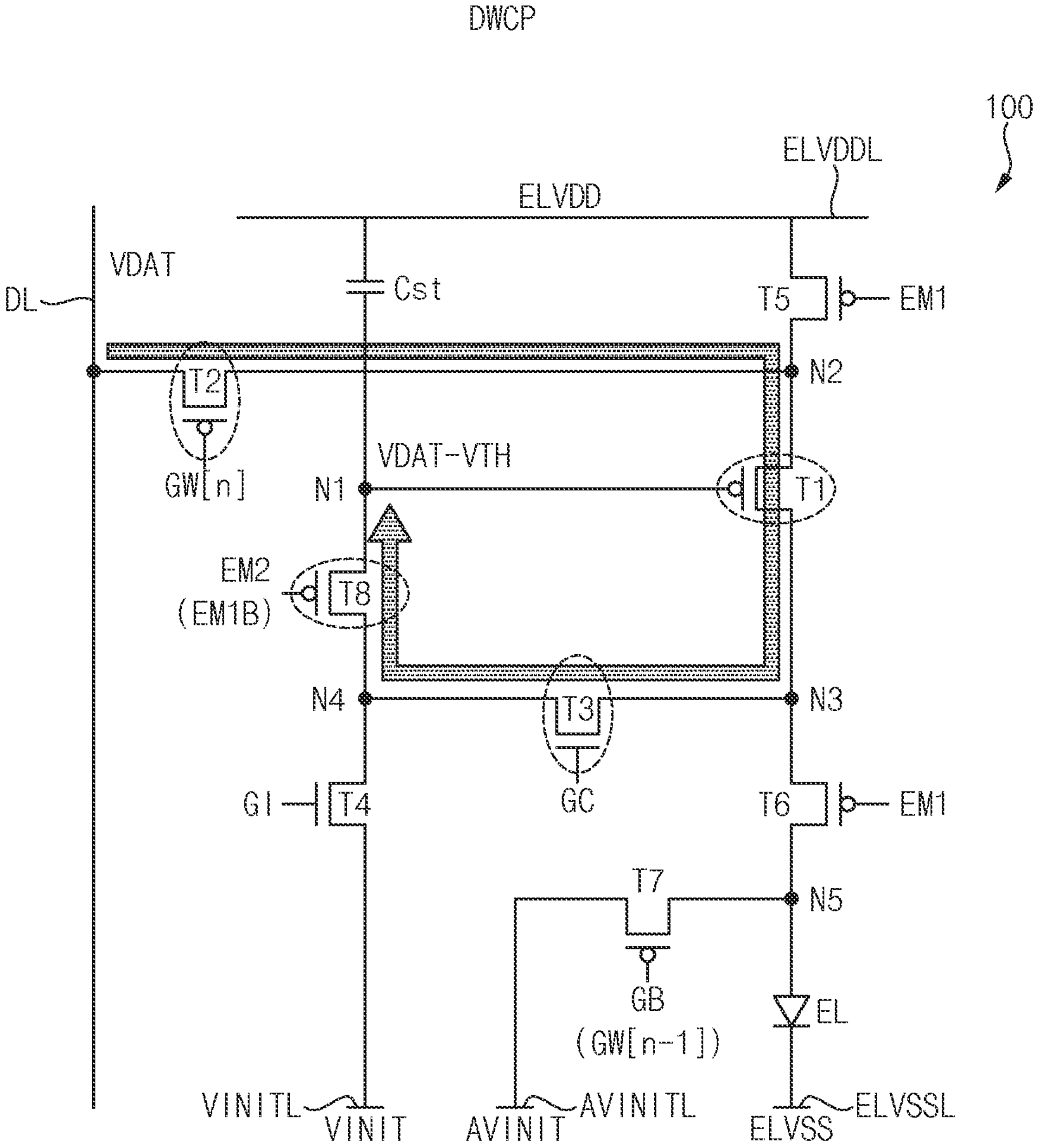
FIG. 4 is a circuit diagram for describing an operation of a pixel in a data writing and compensation period.
Figure 5:
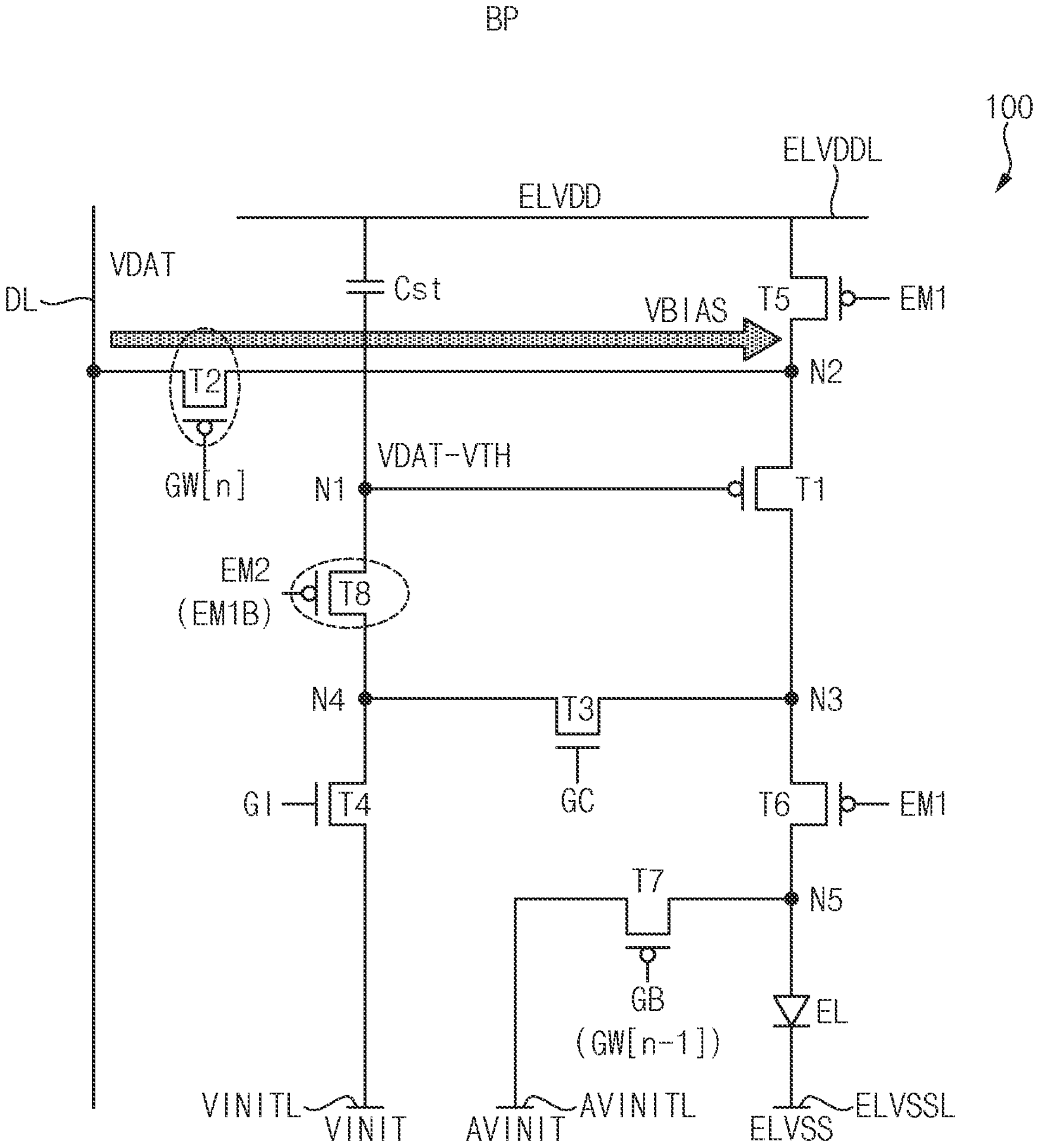
FIG. 5 is a circuit diagram for describing an operation of a pixel a bias period.
Figure 6:
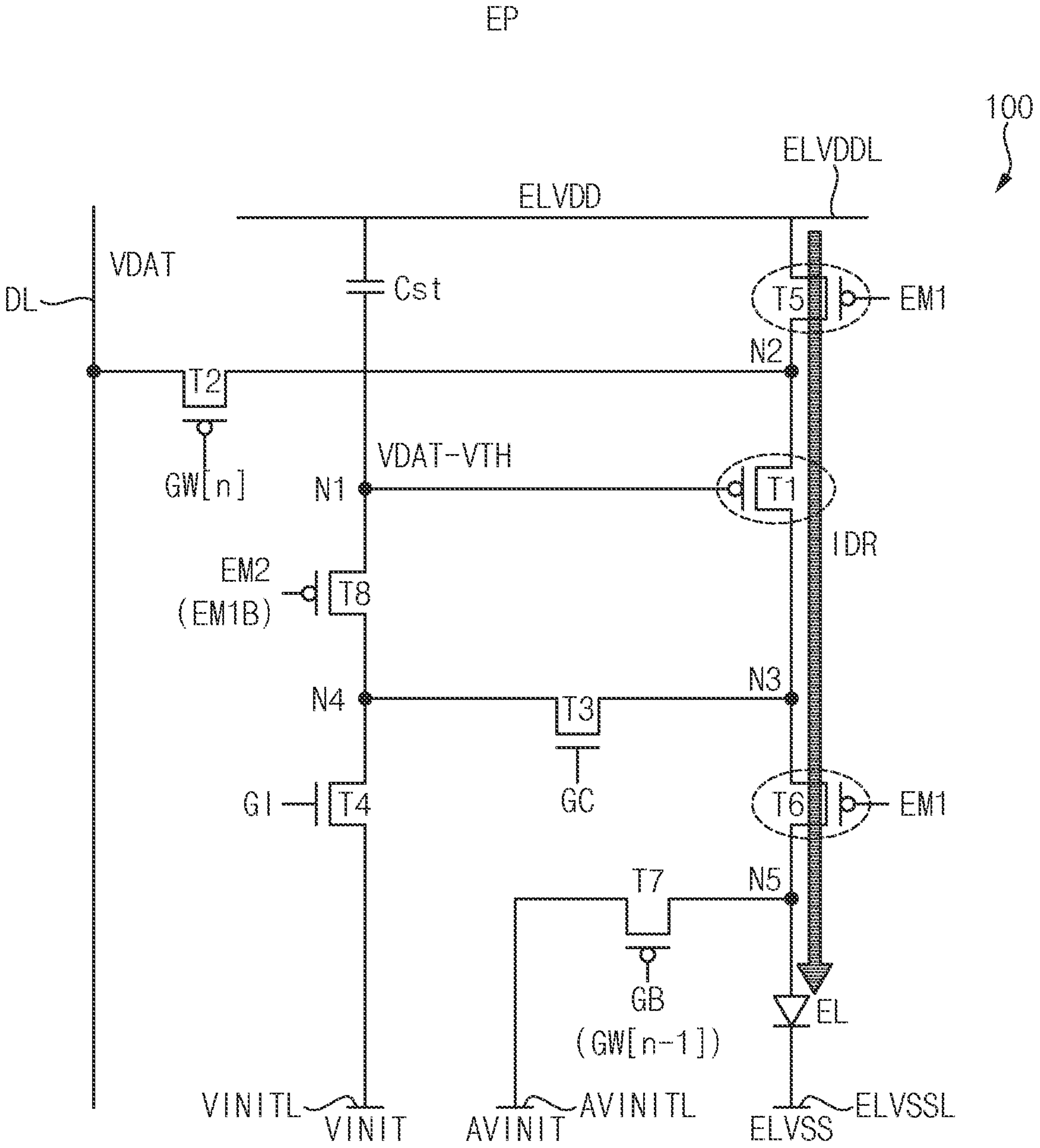
FIG. 6 is a circuit diagram for describing an operation of a pixel in an emission period.

FIG. 2 is a timing diagram for describing an example of an operation of a pixel according to some embodiments, FIG. 3 is a circuit diagram for describing an operation of a pixel in an initialization period, FIG. 4 is a circuit diagram for describing an operation of a pixel in a data writing and compensation period, FIG. 5 is a circuit diagram for describing an operation of a pixel a bias period, and FIG. 6 is a circuit diagram for describing an operation of a pixel in an emission period.

Referring to FIGS. 1 and 2, a frame period FP for a pixel 100 may include a non-emission period NEP in which a light emitting element EL does not emit light, and an emission period EP in which the light emitting element EL emits light. In some embodiments, a second emission signal EM2 may have a phase opposite to a phase of a first emission signal EM1, and be an inverted signal EM1B of the first emission signal EM1. In this case, the second emission signal EM2 may have a falling edge at an end time point of the emission period EP, or at a start time point of the non-emission period NEP, and may have a rising edge at an end time point of the non-emission period NEP, or at a start time point of the emission period EP.

The non-emission period NEP may include an initialization period IP in which a first node N1 is initialized, and a data writing and compensation period DWCP in which a data voltage of a data line DL (or a voltage where a threshold voltage of a first transistor T1 is subtracted from the data voltage) is applied to the first node N1. In some embodiments, as illustrated in FIG. 2, the non-emission period NEP may further include, after the data writing and compensation period DWCP, a bias period BP in which a bias voltage is applied to a second node N2. According to some embodiments, the non-emission period NEP may further include, before the data writing and compensation period DWCP in which a writing signal GW[n] for the pixel 100 is activated, and/or before the bias period BP, an anode initialization period in which a bypass signal GB, or a previous writing signal GW[n−1] for a previous pixel row is activated. In the anode initialization period, a seventh transistor T7 may be turned on in response to the bypass signal GB, an anode initialization voltage AVINIT of an anode initialization voltage line AVINITL may be provided to a fifth node N5, or an anode of the light emitting element EL, and thus the anode of the light emitting element EL may be initialized.

In the initialization period IP, the first emission signal EM1 may have an inactive level (e.g., a high level), the second emission signal EM2 may have an active level (e.g., a low level), an initialization signal GI may have an active level (e.g., the high level), a compensation signal GC may have an inactive level (e.g., the low level), and a writing signal GW[n] may have the inactive level (e.g., the high level). As illustrated in FIG. 3, a fourth transistor T4 may be turned on in response to the initialization signal GI having the active level (e.g., the high level), and an eighth transistor T8 may be turned on in response to the second emission signal EM2 having the active level (e.g., the low level). An initialization voltage VINIT of an initialization voltage line VINITL may be applied to the first node N1, or a gate node through the fourth transistor T4 and the eighth transistor T8.

In the data writing and compensation period DWCP, the first emission signal EM1 may have the inactive level (e.g., the high level), the second emission signal EM2 may have the active level (e.g., the low level), the initialization signal GI may have the inactive level (e.g., the low level), the compensation signal GC may have the active level (e.g., the high level), and the writing signal GW[n] may have the active level (e.g., the low level). As illustrated in FIG. 4, a second transistor T2 may be turned on in response to the writing signal GW[n] having the active level (e.g., the low level), a third transistor T3 may be turned on in response to the compensation signal GC having the active level (e.g., the high level), and the eighth transistor T8 may be turned on in response to the second emission signal EM2 having the active level (e.g., the low level).

The data voltage VDAT of the data line DL may be applied to the first node N1 through the second transistor T2, the first transistor T1, the third transistor T3 and the eighth transistor T8. In this case, the first transistor T1 may be diode-connected by the third transistor T3 and the eighth transistor T8, the data voltage VDAT may be applied to the first node N1 through the diode-connected first transistor T1, and thus a voltage V_N1 of the first node N1 may become the voltage VDAT-VTH where the threshold voltage VTH of the first transistor T1 is subtracted from the data voltage VDAT.

Although the voltage V_N1 of the first node N1 becomes the voltage VDAT-VTH where the threshold voltage VTH is subtracted from the data voltage VDAT in the data writing and compensation period DWCP, the voltage V_N1 of the first node N1 may be decreased as a falling edge FE of the compensation signal GC after the data writing and compensation period DWCP. That is, by a parasitic capacitor between a gate of the third transistor T3 and a second terminal of the third transistor T3, or a parasitic capacitor between a line of the compensation signal GC and the first node N1 (or a second node of a first capacitor Cst), a kickback phenomenon where the voltage V_N1 of the first node N1 is decreased by a kickback voltage at the falling edge FE of the compensation signal GC may occur. Because the voltage V_N1 of the first node N1 is decreased, the data voltage VDAT should be increased such that the voltage V_N1 of the first node N1 has a desired voltage level in the emission period EP. Further, this kickback voltage, or an increase amount of the data voltage VDAT may be relatively small (because the first transistor T1 is turned on) with respect to the minimum data voltage (e.g., a white data voltage) for the maximum gray level (e.g., a 255-gray level), but may be relatively great (because the first transistor T1 is turned off) with respect to the maximum data voltage (e.g., a black data voltage) for the minimum gray level (e.g., a 0-gray level). Thus, a swing range of the data voltage VDAT may be increased by the kickback phenomenon caused by the compensation signal GC, and thus power consumption of a display device may be increased by the increase of the swing range of the data voltage VDAT.

In the bias period BP, the first emission signal EM1 may have the inactive level (e.g., the high level), the second emission signal EM2 may have the active level (e.g., the low level), the initialization signal GI may have the inactive level (e.g., the low level), the compensation signal GC may have the inactive level (e.g., the low level), and the writing signal GW[n] may have the active level (e.g., the low level). As illustrated in FIG. 5, the second transistor T2 may be turned on in response to the writing signal GW[n] having the active level (e.g., the low level), and a bias voltage VBIAS of the data line DL may be applied to the second node N2 through the second transistor T2. A hysteresis of the first transistor T1 may be removed or reduced based on the bias voltage VBIAS applied to the second node N2. In some embodiments, the bias voltage VBIAS may be, but not be limited to, a data voltage for a pixel located in a row different from a row in which the pixel 100 is located. In other embodiments, the bias voltage VBIAS may be a constant voltage having a voltage level (e.g., a set or predetermined voltage level).

In the emission period EP, the first emission signal EM1 may have the active level (e.g., the low level), the second emission signal EM2 may have the inactive level (e.g., the high level), the initialization signal GI may have the inactive level (e.g., the low level), the compensation signal GC may have the inactive level (e.g., the low level), and the writing signal GW[n] may have the inactive level (e.g., the high level). As illustrated in FIG. 6, the first transistor T1 may generate a driving current IDR based on the voltage V_N1 of the first node N1, and the fifth transistor T5 and the sixth transistor T6 may be turned on in response to the first emission signal EM1 having the active level (e.g., the low level). Thus, the driving current IDR generated by the first transistor T1 may be provided to the light emitting element EL, and the light emitting element EL may emit light based on the driving current IDR.

In a case where the pixel 100 does not include the eighth transistor T8, at the start time point of the emission period EP, or at a falling edge of the first emission signal EM1, the voltage V_N1' of the first node N1 may be further decreased by a kickback phenomenon caused by the first emission signal EM1. Thus, in the case where the pixel 100 does not include the eighth transistor T8, the swing range of the data voltage VDAT may be further increased by the kickback phenomenon caused by the first emission signal EM1, and thus the power consumption of the display device may be further increased.

However, in the pixel 100 according to some embodiments, when the light emitting element EL may emit light after the voltage V_N1 of the first node N1 becomes the voltage VDAT-VTH where the threshold voltage VTH is subtracted from the data voltage VDAT, or at the start time point of the emission period EP, the second emission signal EM2 may have a rising edge RE. Further, at the start time point of the emission period EP, or at the rising edge RE of the second emission signal EM2, the voltage V_N1 of the first node N1 may be increased. That is, by a parasitic capacitor between a gate of the eighth transistor T8 and a first terminal of the eighth transistor T8, or a parasitic capacitor between a line of the second emission signal EM2 and the first node N1, a kickback phenomenon where the voltage V_N1 of the first node N1 is increased by a kickback voltage at the rising edge RE of the second emission signal EM2 may occur.

Thus, the voltage V_N1 of the first node N1 that was decreased by the kickback phenomenon caused by the compensation signal GC may be increased or compensated by the kickback phenomenon at the rising edge RE of the second emission signal EM2. Accordingly, in the pixel 100 according to some embodiments, by using the kickback phenomenon at the rising edge RE of the second emission signal EM2, the swing range of the data voltage VDAT may be reduced, and power consumption of a display device including the pixel 100 may be reduced.

Figure 7:
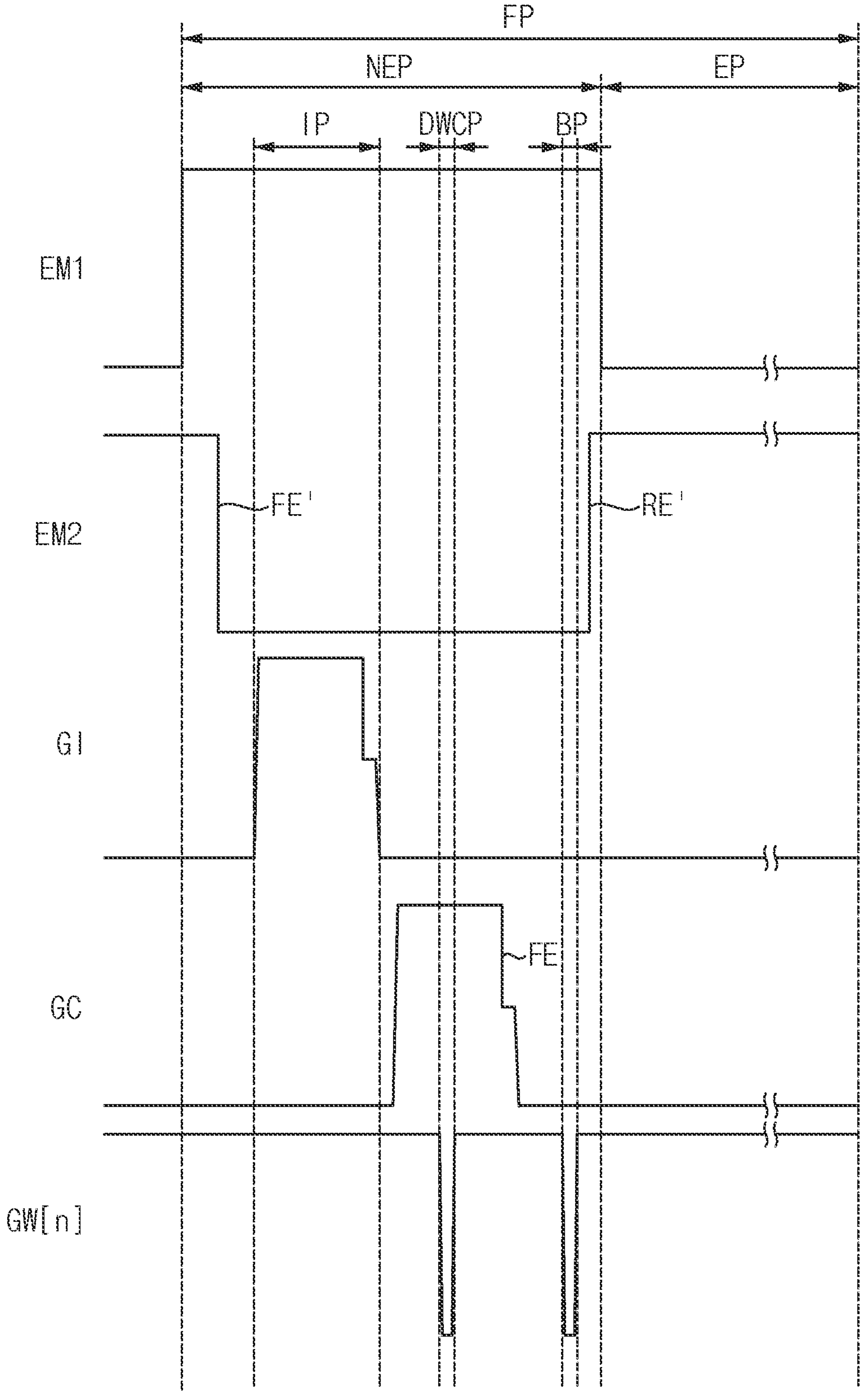
FIG. 7 is a timing diagram for describing an example of an operation of a pixel according to some embodiments.

FIG. 7 is a timing diagram for describing an example of an operation of a pixel according to some embodiments.

A timing diagram of FIG. 7 may be substantially the same as a timing diagram of FIG. 2, except that timings of a falling edge FE' and a rising edge RE' of a second emission signal EM2 are different from timings illustrated in FIG. 2.

Referring to FIG. 7, the second emission signal EM2 may be activated after a first emission signal EM1 is deactivated and before at least one of writing, initialization and compensation signals GW[n], GI and GC is activated, and may be deactivated before the first emission signal EM1 is activated and after all of the writing, initialization and compensation signals GW[n], GI and GC are deactivated. For example, the second emission signal EM2 may have the falling edge FE' between a start time point of a non-emission period NEP and a start time point of an initialization period IP, and may have the rising edge RE' between an end time point of a bias period BP and an end time point of the non-emission period NEP. Thus, after a data voltage is applied to a first node through second, first, third and eighth transistors, and before a light emitting element emits light, the second emission signal EM2 may have the rising edge RE', and a voltage of the first node may be increased by a kickback phenomenon at the rising edge RE' of the second emission signal EM2. Accordingly, a swing range of the data voltage may be reduced, and power consumption of a display device may be reduced.

Figure 8:
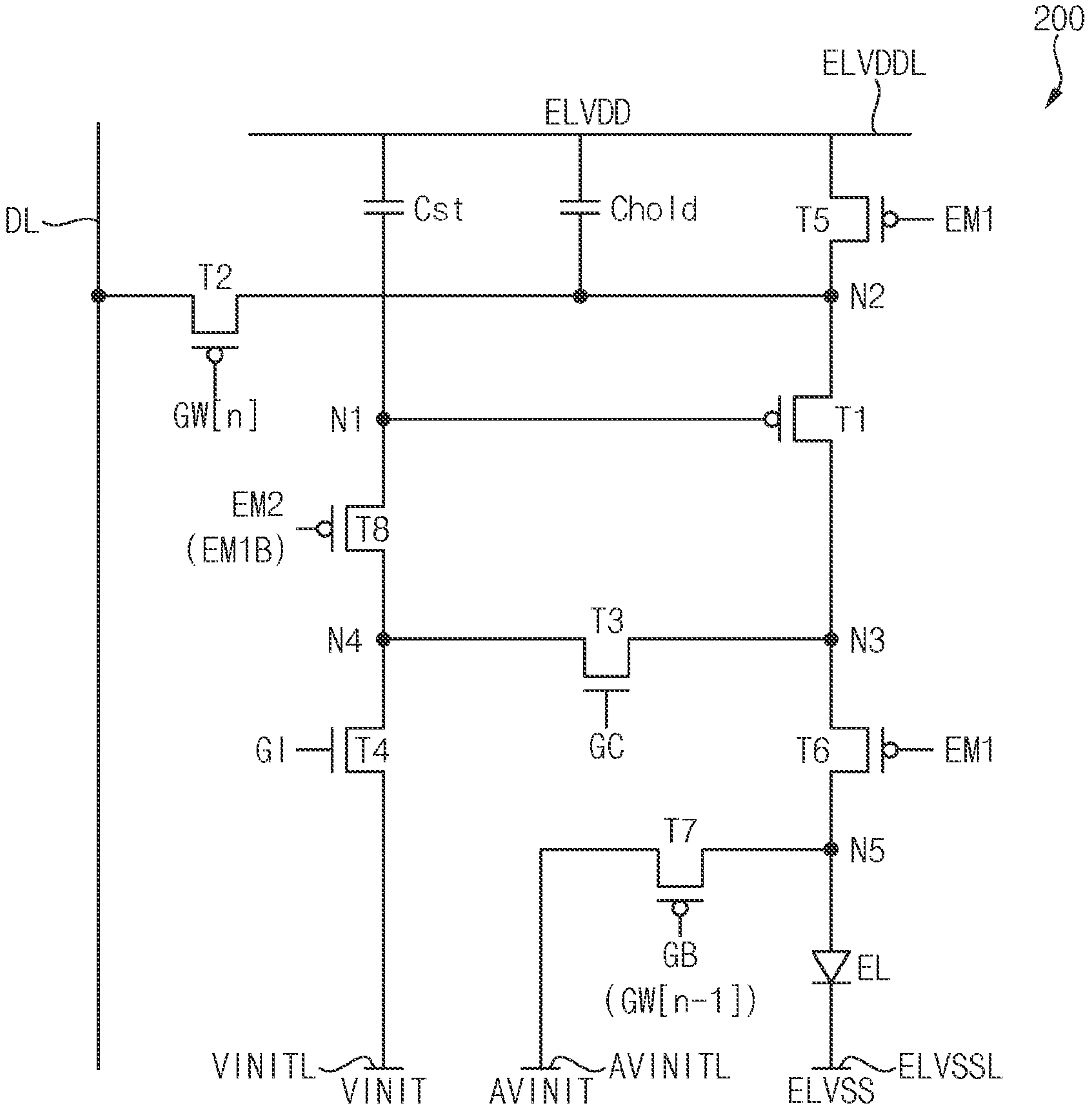
FIG. 8 is a circuit diagram illustrating a pixel of a display device according to some embodiments.
Figure 9:
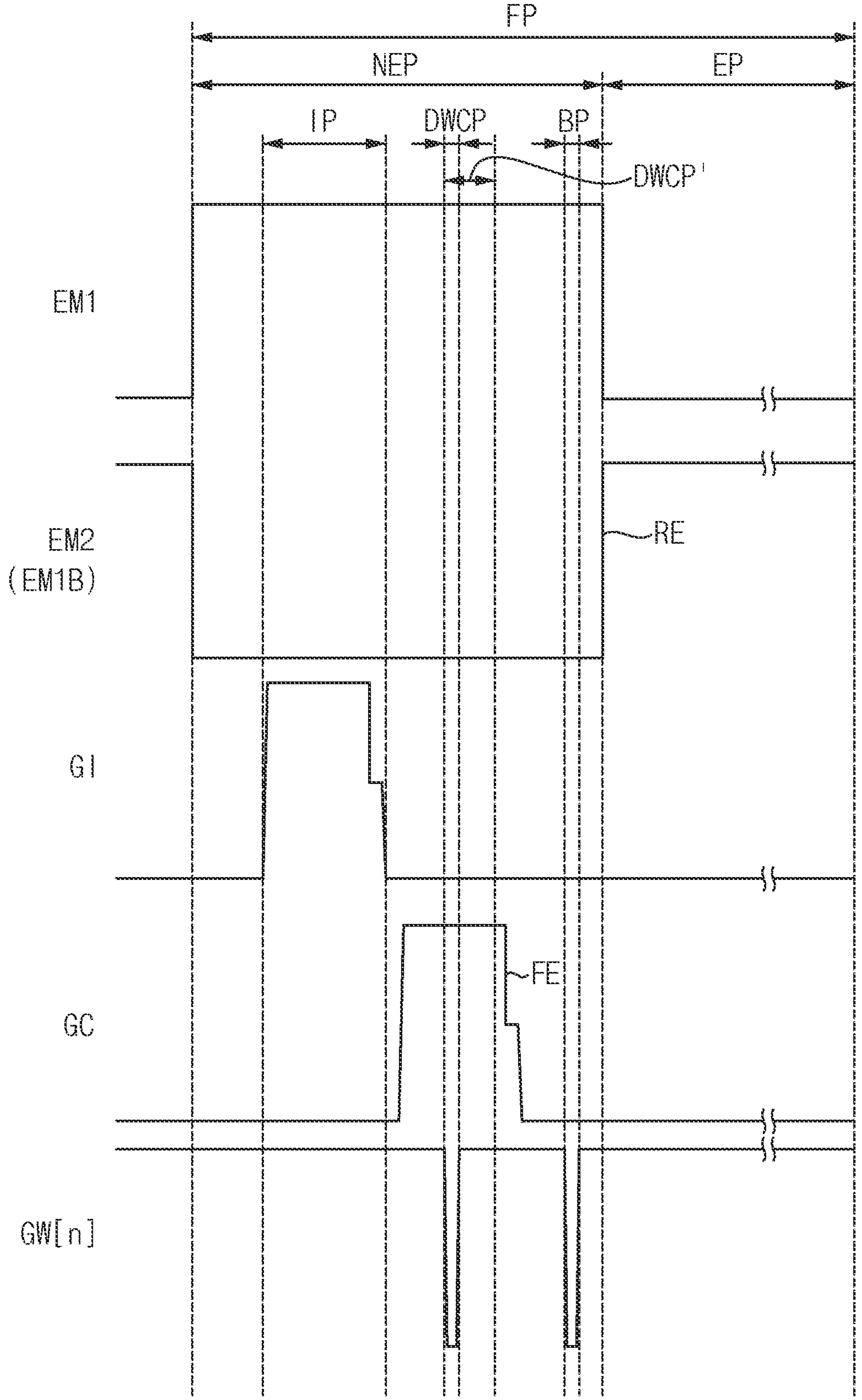
FIG. 9 is a timing diagram for describing an example of an operation of a pixel according to some embodiments.

FIG. 8 is a circuit diagram illustrating a pixel of a display device according to some embodiments, and FIG. 9 is a timing diagram for describing an example of an operation of a pixel according to some embodiments.

Referring to FIG. 8, a pixel 200 according to some embodiments may include a first capacitor Cst, a second capacitor Chold, a first transistor T1, a second transistor T2, a third transistor T3, a fourth transistor T4, a fifth transistor T5, a sixth transistor T6, a seventh transistor T7, a light emitting element EL and an eighth transistor T8. The pixel 200 of FIG. 8 may have substantially the same configuration and substantially the same operation as a pixel 100 of FIG. 1, except that the pixel 200 may further include the second capacitor Chold coupled between a first power supply voltage line ELVDDL and a second node N2. Further, a timing diagram of FIG. 9 may be substantially the same as a timing diagram of FIG. 2, except that a data writing and compensation period DWCP' is increased compared with a data writing and compensation period DWCP illustrated in FIG. 2.

The second capacitor Chold may hold a data voltage applied to the second node N2 through a data line DL and the second transistor T2. In some embodiments, the second capacitor Chold may be referred to as a hold capacitor. Further, in some embodiments, the second capacitor Chold may include a first electrode coupled to the first power supply voltage line ELVDDL, and a second electrode coupled to the second node N2.

As illustrated in FIG. 9, even if signals EM1, EM2, GI, GC and GW[n] substantially the same as signals EM1, EM2, GI, GC and GW[n] illustrated in FIG. 2 are applied to the pixel 200, the data writing and compensation period DWCP' for the pixel 200 may be increased compared with the data writing and compensation period DWCP for the pixel 100 illustrated in FIG. 1. In some embodiments, the data writing and compensation period DWCP' for the pixel 200 may be extended to, in maximum, a falling edge FE of a compensation signal GC. The second capacitor Chold may store the data voltage while a writing signal GW[n] has an active level, and may hold the data voltage at the second node N2 after the writing signal GW[n] is deactivated. Accordingly, even after the writing signal GW[n] is deactivated, a data writing and compensation operation that applies the data voltage through the diode-connected first transistor T1 to a first node N1 may be performed. As described above, because the data writing and compensation period DWCP' for the pixel 200 is increased, even if a display device including the pixel 200 operates at a high frequency (e.g., about 240 Hz), the data writing and compensation operation may be normally performed.

Figure 10:
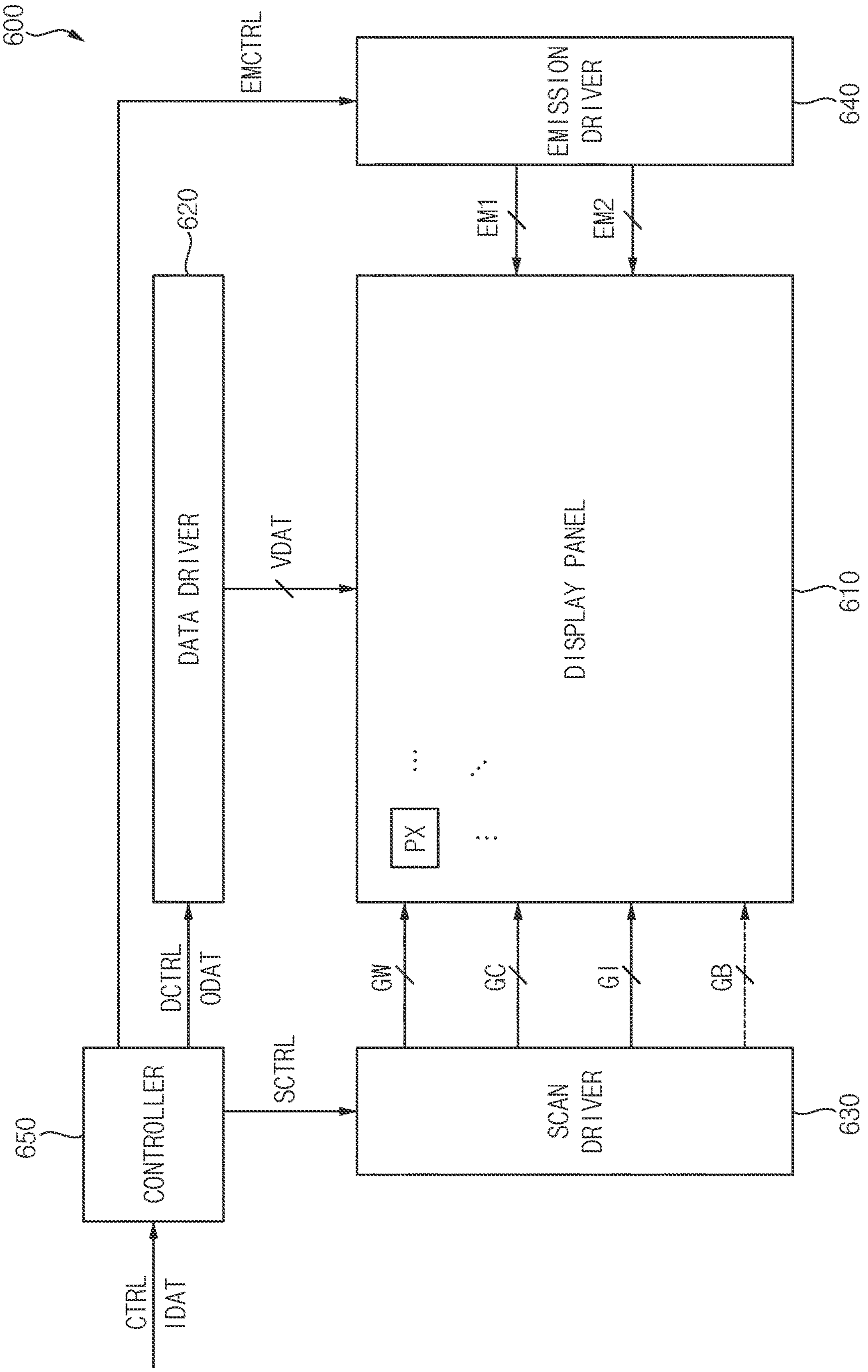
FIG. 10 is a block diagram illustrating a display device according to some embodiments.

FIG. 10 is a block diagram illustrating a display device according to some embodiments.

Referring to FIG. 10, a display device 600 according to some embodiments may include a display panel 610 including a plurality of pixels PX, a data driver 620 providing a data voltage VDAT to each of the plurality of pixels PX, a scan driver 630 providing a writing signal GW, a compensation signal GC, an initialization signal GI and/or a bypass signal GB to each of the plurality of pixels PX, an emission driver 640 providing first and second emission signals EM1 and EM2 having different phases to each of the plurality of pixels PX, and a controller 650 controlling the data driver 620, the scan driver 630 and the emission driver 640.

The display panel 610 may include the plurality of pixels PX. According to some embodiments, each pixel PX of the display panel 610 may be a pixel 100 of FIG. 1, a pixel 200 of FIG. 8, or the like. Each pixel PX may include an eighth transistor that couples a first node and a fourth node to each other in response to the second emission signal EM2. A voltage of the first node may be increased at a rising edge of the second emission signal EM2. Accordingly, a swing range of the data voltage VDAT may be relatively reduced, and power consumption of the display device 600 may be relatively reduced. In some embodiments, each pixel PX may further include a second capacitor coupled between a first power supply voltage line ELVDDL and a second node. A data writing and compensation period may be increased by the second capacitor for holding the data voltage VDAT applied to the second node. Thus, even if the display device 600 operates at a high frequency (e.g., about 240 Hz), each pixel PX may normally perform a data writing and compensation operation.

The data driver 620 may provide the data voltages VDAT to the plurality of pixels PX based on output image data ODAT and a data control signal DCTRL received from the controller 650. In some embodiments, the data control signal DCTRL may include, but not limited to, an output data enable signal, a horizontal start signal and a load signal. In some embodiments, the data driver 620 and the controller 650 may be implemented with a single integrated circuit, and the single integrated circuit may be referred to as a timing controller embedded data driver (TED). In other embodiments, the data driver 620 and the controller 650 may be implemented with separate integrated circuits.

The scan driver 630 may provide the writing signals GW, the compensation signals GC, the initialization signals GI and/or the bypass signals GB to the plurality of pixels PX based on a scan control signal SCTRL received from the controller 650. In some embodiments, the scan control signal SCTRL may include, but not limited to, a scan start signal and a scan clock signal. In some embodiments, the scan driver 630 may be integrated or formed in a peripheral portion of the display panel 610. In other embodiments, the scan driver 630 may be integrated or formed in a display region of the display panel 610. In still other embodiments, the scan driver 630 may be implemented with one or more integrated circuits.

The emission driver 640 may provide the first emission signals EM1 and the second emission signals EM2 to the plurality of pixels PX based on an emission control signal EMCTRL received from the controller 650. The emission control signal EMCTRL may include, but not limited to, an emission start signal and an emission clock signal. The second emission signal EM2 may have a phase (e.g., an opposite phase) different from a phase of the first emission signal EM1. In some embodiments, the second emission signal EM2 may be an inverted signal of the first emission signal EM1. For example, the second emission signal EM2 may be activated based on the first emission signal EM1 being deactivated, and may be deactivated based on the first emission signal EM1 being activated. In other embodiments, the second emission signal EM2 may be activated after the first emission signal EM1 is deactivated and before at least one of the writing, initialization and compensation signals GW[n], GI and GC is activated, and may be deactivated before the first emission signal EM1 is activated and after all of the writing, initialization and compensation signals GW[n], GI and GC are deactivated. Further, in some embodiments, the emission driver 640 may be integrated or formed in the peripheral portion of the display panel 610. In other embodiments, the emission driver 640 may be integrated or formed in the display region of the display panel 610. In still other embodiments, the emission driver 640 may be implemented with one or more integrated circuits.

The controller 650 (e.g., a timing controller) may receive input image data IDAT and a control signal CTRL from an external host processor (e.g., a graphics processing unit (GPU), an application processor (AP) or a graphics card). In some embodiments, the control signal CTRL may include, but not limited to, a vertical synchronization signal, a horizontal synchronization signal, an input data enable signal, a master clock signal, etc. The controller 650 may generate the output image data ODAT, the data control signal DCTRL, the scan control signal SCTRL and the emission control signal EMCTRL based on the input image data IDAT and the control signal CTRL. The controller 650 may control an operation of the data driver 620 by providing the output image data ODAT and the data control signal DCTRL to the data driver 620, may control an operation of the scan driver 630 by providing the scan control signal SCTRL to the scan driver 630, and may control an operation of the emission driver 640 by providing the emission control signal EMCTRL to the emission driver 640.

Figure 11:
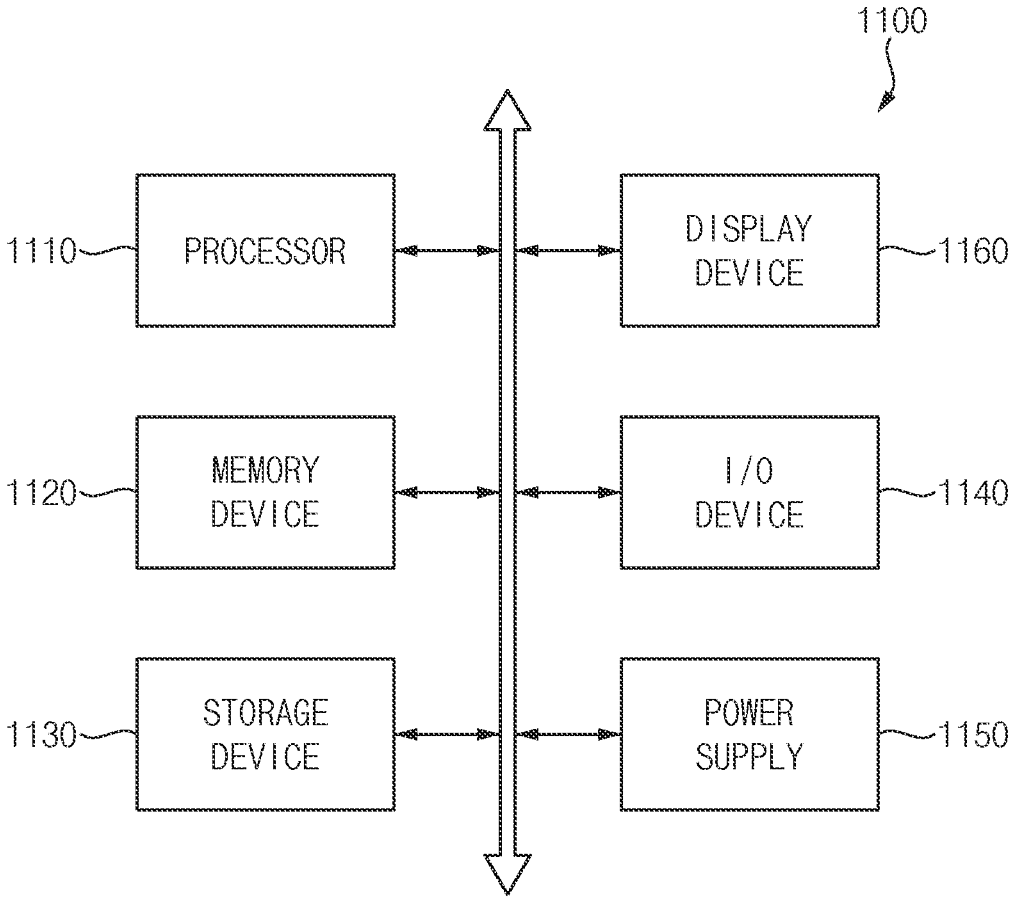
FIG. 11 is a block diagram illustrating an electronic device including a display device according to some embodiments.

FIG. 11 is a block diagram illustrating an electronic device including a display device according to some embodiments.

Referring to FIG. 11, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, each pixel may include an eighth transistor that couples a first node and a fourth node to each other in response to a second emission signal. A voltage of the first node may be increased at a rising edge of the second emission signal. Accordingly, a swing range of a data voltage may be reduced, and power consumption of the display device 1160 may be reduced. In some embodiments, each pixel may further include a second capacitor coupled between a first power supply voltage line and a second node. A data writing and compensation period may be increased by the second capacitor for holding a data voltage applied to the second node. Thus, even if the display device 1160 operates at a high frequency (e.g., about 240 Hz), each pixel may normally perform a data writing and compensation operation.

The inventive concepts may be applied to any display device 1160 and any electronic device 1100 including the display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

Figure 12:
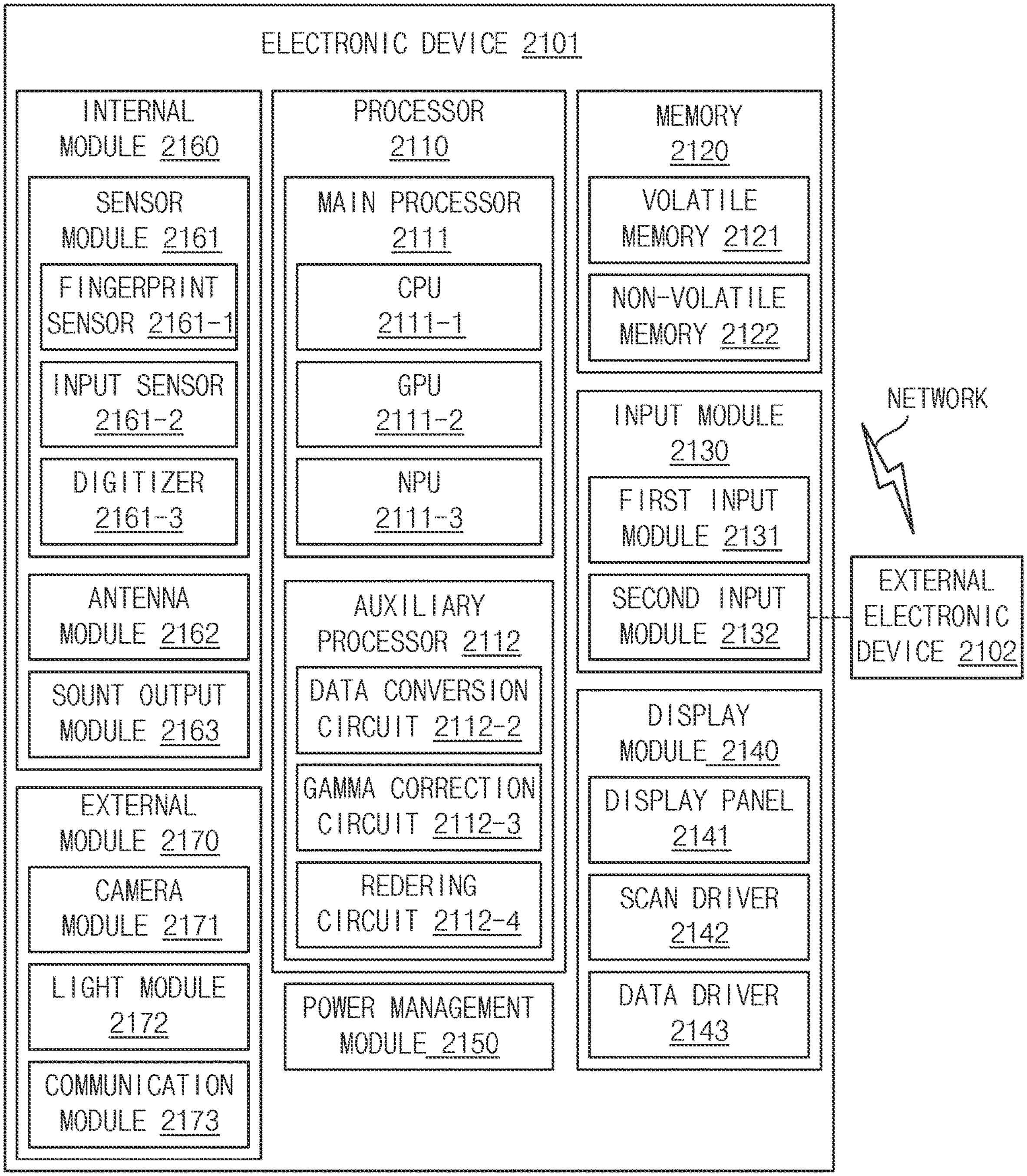
FIG. 12 is a block diagram illustrating an example of an electronic device according to some embodiments.

FIG. 12 is a block diagram illustrating an example of an electronic device according to some embodiments.

An electronic device 2101 may output various information via a display module 2140 in an operating system. In response to a processor 2110 executing an application stored in a memory 2120, the display module 2140 may provide application information to a user via a display panel 2141.

The processor 2110 may obtain an external input via an input module 2130 or a sensor module 2161 and may execute an application corresponding to the external input. For example, in response to the user selecting a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, in response to personal information authentication being executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As still another example, in response to a music streaming icon displayed on the display module 2140 being selected, the processor 2110 obtains a user input via the input sensor 2161-2 and may activate a music streaming application stored in the memory 2120. In response to a music execution command being input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some of components of the electronic device 2101 described below may be integrated and provided as one component, or one component may be provided separately as two or more components.

Referring to FIG. 12, an electronic device 2101 may communicate with an external electronic device 2102 via a network (e.g., a short-range wireless communication network or a long-range wireless communication network). In some embodiments, the electronic device 2101 may include a processor 2110, a memory 2120, an input module 2130, a display module 2140, a power management module 2150, an internal module 2160 and an external module 2170. In some embodiments, at least one of the components may be omitted from the electronic device 2101, or one or more other components may be added in the electronic device 2101. In some embodiments, some of the components (e.g., the sensor module 2161, an antenna module 2162, or the sound output module 2163) may be implemented as a single component (e.g., the display module 2140).

The processor 2110 may execute software to control at least one other component (e.g., a hardware or software component) of the electronic device 2101 coupled with the processor 2110, and may perform various data processing or computation. According to some embodiments, as at least part of the data processing or computation, the processor 2110 may store a command or data received from another component (e.g., the input module 2130, the sensor module 2161 or a communication module 2173) in volatile memory 2121, may process the command or the data stored in the volatile memory 2121, and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP), and an image signal processor (ISP). The main processor 2111 may further include a neural processing unit (NPU) 2111-3. The NPU 2111-3 may be a processor specialized in processing an artificial intelligence model, and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip), or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140, and may output image data. The controller may output various control signals required for driving the display module 2140.

The auxiliary processor 2112 may further include a data conversion circuit 2112-2, a gamma correction circuit 2112-3, a rendering circuit 2112-4, or the like. The data conversion circuit 2112-2 may receive image data from the controller. The data conversion circuit 2112-2 may compensate for the image data such that an image is displayed with a desired luminance according to characteristics of the electronic device 2101 or the user's setting, or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161, or the sound output module 2163) of the electronic device 2101 from the outside of the electronic device 2101 (e.g., the user or the external electronic device 2102).

The input module 2130 may include a first input module 2131 configured to receive a command or data from the user, and a second input module 2132 configured to receive a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In some embodiments, the second input module 2132 may include a high definition multimedia interface (HDMI), a universal serial bus (USB) interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver 2142 and a data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel, or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit (ASG), a low temperature polycrystalline silicon (LTPS) TFT gate driver circuit or an oxide semiconductor TFT gate driver circuit (OSG) embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142, or may be integrated into the scan driver 2142.

The data driver 2143 may receive a control signal from the controller, may convert image data into analog voltages (e.g., data voltages) in response to the control signal, and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit, or the like. The voltage generator circuit may output various voltages required for driving the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable, or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131, and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen, or may transmit/receive data to/from the active pen.

The input sensor 2161-2 may measure a bio-signal, such as blood pressure, moisture or body fat. For example, in response to a portion of the body of the user (e.g., a finger) touching a sensor layer or a sensing panel, and not moving for a certain period of time (e.g., a set or predetermined amount of time), the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, or may transmit/receive data to/from the active pen.

At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be located above the display panel 2141, or at least one of the fingerprint sensor 2161-1, the input sensor 2161-2 and the digitizer 2161-3 may be located below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be located between the display panel 2141 and a window located above the display panel 2141. In some embodiments, the sensing panel may be located on the window, but the location of the sensing panel is not limited thereto.

At least one of the fingerprint sensor 2161-1, the input sensor 2161-2 and the digitizer 2161-3 may be embedded in the display panel 2141. That is, at least one of the fingerprint sensor 2161-1, the input sensor 2161-2 and the digitizer 2161-3 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The antenna module 2162 may include one or more antennas configured to transmit and/or receive a signal or power to or from the outside. In some embodiments, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In some embodiments, the receiver may be implemented as separate from, or as part of the speaker. A sound output pattern of the sound output module 2163 may be integrated into the display module 2140.

The camera module 2171 may capture a still image and a moving image. In some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171, or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system (GNSS) communication module) or a wired communication module (e.g., a local area network (LAN) communication module or a power line communication (PLC) module). The communication module 2173 may communicate with the external electronic device 2102 via a short-range communication network (e.g., Bluetooth™, wireless-fidelity (Wi-Fi) direct, or infrared data association (IrDA)) or a long-range communication network (e.g., a cellular network, the Internet or a computer network (e.g., LAN or wide area network (WAN)). These various types of communication modules 2173 may be implemented as a single chip, or may be implemented as multi-chips separate from each other.

The input module 2130, the sensor module 2161, the camera module 2171, and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen, and may output the image data to the display module 2140. Alternatively, the processor 2110 may generate command data corresponding to the input data, and may output the command data to the camera module 2171 or the light module 2172. When no input data is received from the input module 2130 for a certain period of time (e.g., a set or predetermined amount of time), the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120, and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161, and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data, and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI) or ultra-path interconnect (UPI)). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. For example, the electronic device 2101 may include at least one of a portable communication device (e.g., a smart phone), a computer device, a portable multimedia device, a portable medical device, a camera, a wearable device and a home appliance. However, the electronic device 2101 according to some embodiments is not limited to the above-described devices.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, and their equivalents.

What is claimed is:

1. A pixel of a display device, the pixel comprising:

a first capacitor coupled between a first power supply voltage line and a first node;

a first transistor including a gate coupled to the first node, a first terminal coupled to a second node, and a second terminal coupled to a third node;

a second transistor including a gate configured to receive a writing signal, a first terminal coupled to a data line, and a second terminal coupled to the second node;

a third transistor including a gate configured to receive a compensation signal, a first terminal coupled to the third node, and a second terminal coupled to a fourth node;

a fourth transistor including a gate configured to receive an initialization signal, a first terminal coupled to the fourth node, and a second terminal coupled to an initialization voltage line;

a fifth transistor including a gate configured to receive a first emission signal, a first terminal coupled to the first power supply voltage line, and a second terminal coupled to the second node;

a light emitting element including an anode coupled to the third node, and a cathode coupled to a second power supply voltage line;

a seventh transistor including a gate configured to receive a bypass signal, a first terminal coupled to an anode initialization voltage line, and a second terminal coupled to the anode of the light emitting element, wherein the bypass signal is a previous writing signal for a previous pixel row that is physically immediately adjacent to a pixel row of the pixel; and an eighth transistor including a gate configured to receive a second emission signal having a phase different from a phase of the first emission signal, a first terminal coupled to the first node, and a second terminal coupled to the fourth node.

2. The pixel of claim 1, wherein, after a data voltage of the data line is applied to the first node through the second transistor, the first transistor, the third transistor and the eighth transistor, and before or based on the light emitting element emitting light, the second emission signal has a rising edge, and wherein a voltage of the first node increases at the rising edge of the second emission signal.

3. The pixel of claim 1, wherein the second emission signal is an inverted signal of the first emission signal.

4. The pixel of claim 1, further comprising:

a sixth transistor including a gate configured to receive the first emission signal, a first terminal coupled to the third node, and a second terminal coupled to the anode of the light emitting element.

5. The pixel of claim 1, wherein the first, second, fifth and eighth transistors are implemented with p-type metal-oxide-semiconductor (PMOS) transistors, and wherein the third and fourth transistors are implemented with n-type metal-oxide-semiconductor (NMOS) transistors.

6. The pixel of claim 1, wherein a frame period for the pixel includes a non-emission period in which the light emitting element does not emit light, and an emission period in which the light emitting element emits light, and wherein the non-emission period includes an initialization period in which the first node is initialized, and a data writing and compensation period in which a data voltage of the data line is applied to the first node.

7. The pixel of claim 6, wherein, in the initialization period, the initialization signal and the second emission signal have an active level, the writing signal, the compensation signal and the first emission signal have an inactive level, the fourth transistor is configured to be turned on in response to the initialization signal having the active level, the eighth transistor is configured to be turned on in response to the second emission signal having the active level, and an initialization voltage of the initialization voltage line is applied to the first node through the fourth transistor and the eighth transistor.

8. The pixel of claim 6, wherein, in the data writing and compensation period, the writing signal, the compensation signal and the second emission signal have an active level, and the initialization signal and the first emission signal have an inactive level, the second transistor is configured to be turned on in response to the writing signal having the active level, the third transistor is configured to be turned on in response to the compensation signal having the active level, the eighth transistor is configured to be turned on in response to the second emission signal having the active level, and a data voltage of the data line is applied to the first node through the second transistor, the first transistor, the third transistor and the eighth transistor.

9. The pixel of claim 6, wherein the non-emission period further includes a bias period in which a bias voltage is applied to the second node after the data writing and compensation period.

10. The pixel of claim 9, wherein, in the bias period, the writing signal and the second emission signal have an active level, the compensation signal, the initialization signal and the first emission signal have an inactive level, the second transistor is configured to be turned on in response to the writing signal having the active level, and the bias voltage of the data line is configured to be applied to the second node through the second transistor.

11. The pixel of claim 6, wherein, in the emission period, the first emission signal has an active level, the writing signal, the compensation signal, the initialization signal and the second emission signal have an inactive level, the fifth transistor is configured to be turned on in response to the first emission signal having the active level, the first transistor is configured to generate a driving current based on a voltage of the first node, and the light emitting element is configured to emit light based on the driving current.

12. The pixel of claim 6, wherein the second emission signal is activated based on the first emission signal being deactivated, and is deactivated based on the first emission signal being activated.

13. The pixel of claim 6, wherein the second emission signal is activated after the first emission signal is deactivated and before at least one of the writing, initialization and compensation signals is activated, and is deactivated before the first emission signal is activated and after all of the writing, initialization and compensation signals are deactivated.

14. The pixel of claim 1, further comprising:

a second capacitor coupled between the first power supply voltage line and the second node.

15. The pixel of claim 14, wherein the second capacitor holds a data voltage applied to the second node through the data line and the second transistor.

16. A pixel of a display device, the pixel comprising:

a first capacitor coupled between a first power supply voltage line and a first node;

a second capacitor coupled between the first power supply voltage line and a second node;

a first transistor including a gate coupled to the first node, a first terminal coupled to the second node, and a second terminal coupled to a third node;

a second transistor including a gate configured to receive a writing signal, a first terminal coupled to a data line, and a second terminal coupled to the second node;

a third transistor including a gate configured to receive a compensation signal, a first terminal coupled to the third node, and a second terminal coupled to a fourth node;

a fourth transistor including a gate configured to receive an initialization signal, a first terminal coupled to the fourth node, and a second terminal coupled to an initialization voltage line;

a fifth transistor including a gate configured to receive a first emission signal, a first terminal coupled to the first power supply voltage line, and a second terminal coupled to the second node;

a sixth transistor including a gate configured to receive the emission signal, a first terminal coupled to the third node, and a second terminal coupled to a fifth node;

a seventh transistor including a gate configured to receive a bypass signal, a first terminal coupled to an anode initialization voltage line, and a second terminal coupled to the fifth node, wherein the bypass signal is a previous writing signal for a previous pixel row that is physically immediately adjacent to a pixel row of the pixel;

a light emitting element including an anode coupled to the fifth node, and a cathode coupled to a second power supply voltage line; and an eighth transistor including a gate configured to receive a second emission signal having a phase different from a phase of the first emission signal, a first terminal coupled to the first node, and a second terminal coupled to the fourth node.

17. An electronic device comprising a display device, the display device comprising:

a display panel including a plurality of pixels;

a data driver configured to provide a data voltage to each of the plurality of pixels;

a scan driver configured to provide a writing signal, a compensation signal and an initialization signal to each of the plurality of pixels; and an emission driver configured to provide first and second emission signals having different phases to each of the plurality of pixels, wherein a pixel of the plurality of pixels includes:

a first capacitor coupled between a first power supply voltage line and a first node;

a first transistor including a gate coupled to the first node, a first terminal coupled to a second node, and a second terminal coupled to a third node;

a second transistor including a gate configured to receive the writing signal, a first terminal coupled to a data line, and a second terminal coupled to the second node;

a third transistor including a gate configured to receive the compensation signal, a first terminal coupled to the third node, and a second terminal coupled to a fourth node;

a fourth transistor including a gate configured to receive the initialization signal, a first terminal coupled to the fourth node, and a second terminal coupled to an initialization voltage line;

a fifth transistor including a gate configured to receive the first emission signal, a first terminal coupled to the first power supply voltage line, and a second terminal coupled to the second node;

a light emitting element including an anode coupled to the third node, and a cathode coupled to a second power supply voltage line;

a seventh transistor including a gate configured to receive a bypass signal, a first terminal coupled to an anode initialization voltage line, and a second terminal coupled to the anode of the light emitting element, wherein the bypass signal is a previous writing signal for a previous pixel row that is physically immediately adjacent to a pixel row of the pixel; and an eighth transistor including a gate configured to receive the second emission signal, a first terminal coupled to the first node, and a second terminal coupled to the fourth node.

18. The electronic device of claim 17, wherein, after a data voltage of the data line is applied to the first node through the second transistor, the first transistor, the third transistor and the eighth transistor, and before or based on the light emitting element emitting light, the second emission signal has a rising edge, and wherein a voltage of the first node increases at the rising edge of the second emission signal.

* * * * *